(12) United States Patent
Holla et al.

(10) Patent No.: US 9,407,424 B1
(45) Date of Patent: Aug. 2, 2016

(54) FAST LOCKING CLOCK AND DATA RECOVERY USING ONLY TWO SAMPLES PER PERIOD

(71) Applicant: Texas Instruments Incorporated, Dallas, TX (US)

(72) Inventors: Bharathi Rahuldev Holla, Bangalore (IN); Jagdish Chand Goyal, Bangalore (IN); Biman Chattopadhyay, Bangalore (IN); Sujoy Chakravarty, Bangalore (IN); Sumantra Seth, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/682,249

(22) Filed: Apr. 9, 2015

(51) Int. Cl.
*H04L 7/00* (2006.01)

(52) U.S. Cl.
CPC .................................. *H04L 7/0016* (2013.01)

(58) Field of Classification Search
CPC ......... H04L 7/02; H04L 7/0016; H04L 7/005; H04L 7/0033; H04L 7/033; H04L 7/0331
USPC .................. 375/252, 327, 371–376
See application file for complete search history.

(56) References Cited

U.S. PATENT DOCUMENTS

| | | | | |
|---|---|---|---|---|
| 5,056,118 A * | 10/1991 | Sun | ........................ | H04L 7/033 331/17 |
| 6,509,990 B1 * | 1/2003 | Roberts | ................. | G02F 1/3517 398/154 |
| 7,102,446 B1 * | 9/2006 | Lee | ...................... | H03K 23/507 331/11 |
| 7,191,371 B2 * | 3/2007 | Hsu | ......................... | H04L 1/243 714/716 |
| 7,315,596 B2 * | 1/2008 | Payne | .................... | H03L 7/0814 375/355 |
| 7,397,876 B2 * | 7/2008 | Cranford, Jr. | ......... | H04L 7/0337 375/355 |
| 7,480,358 B2 * | 1/2009 | Partovi | ...................... | H03L 7/06 375/354 |
| 7,545,190 B2 * | 6/2009 | Chiang | .................. | H03K 3/017 327/172 |
| 7,661,052 B2 * | 2/2010 | Cranford, Jr. | .... | G01R 31/31707 714/732 |
| 7,742,520 B2 * | 6/2010 | Simpson | .................. | H04B 3/06 375/229 |
| 8,120,395 B2 * | 2/2012 | Williams | .............. | H04L 7/0025 327/147 |
| 8,180,011 B2 * | 5/2012 | Do | .......................... | H04L 7/033 375/348 |
| 8,180,012 B1 * | 5/2012 | Do | .......................... | H04L 7/033 375/371 |
| 8,415,996 B1 * | 4/2013 | Wong | ..................... | H03L 7/0807 327/152 |
| 8,687,738 B1 * | 4/2014 | Lee | .......................... | H04L 7/033 327/141 |

(Continued)

OTHER PUBLICATIONS

Mehrdad Ramezani and C. Andre T. Salama, "An Improved Bang-bang Phase Detector for Clock and Data Recovery Applications", The 2001 IEEE International Symposium on Circuits and Systems, 2001, ISCAS 2001, Syndey, NSW, May 6-9, 2001, pp. 715-718, vol. 1.

(Continued)

*Primary Examiner* — Emmanuel Bayard
(74) *Attorney, Agent, or Firm* — Ronald O. Neerings; Frank D. Cimino

(57) ABSTRACT

A clock and data recovery module (CDR) is configured to perform fast locking using only two samples per each unit interval (UI). Two clock phase signals are selected from a plurality of clock phase signals. A sequence of data bits is sampled at a rate of two times per UI responsive to the two clock phase signals in which a first sample of each UI is designated as an edge sample a second sample is designated as a data sample. Each edge sample is voted as early/late as compared to an associated data transition of the sequence of data bits by comparing each edge sample to a next data sample. The sample clocks are locked such that edge samples occur in proximity to data transitions by iteratively adjusting a phase of the two selected clock phase signals by a variable step size in response to the early/late vote.

15 Claims, 6 Drawing Sheets

EARLY VOTE
E: EDGE SAMPLE ; D: DATA SAMPLE

LATE VOTE (56) References Cited

U.S. PATENT DOCUMENTS

| | | | | | |
|---|---|---|---|---|---|
| 8,754,678 | B1* | 6/2014 | Schell | ............... | H03B 28/00 327/106 |
| 8,760,209 | B2* | 6/2014 | Schell | ............... | H03H 7/06 327/237 |
| 8,798,217 | B2* | 8/2014 | Kong | ............... | H04L 7/033 324/76.82 |
| 9,077,349 | B2* | 7/2015 | Kong | ............... | H03L 7/07 |
| 9,184,909 | B1* | 11/2015 | McCracken | ............... | H04L 7/042 |
| 9,213,657 | B2* | 12/2015 | Zerbe | ............... | G06F 13/1689 |
| 2006/0062341 | A1* | 3/2006 | Edmondson | ............... | H03L 7/0814 375/376 |
| 2006/0109940 | A1* | 5/2006 | Beukema | ............... | H04L 7/0058 375/350 |
| 2007/0263757 | A1* | 11/2007 | Dally | ............... | H03L 7/0814 375/376 |
| 2015/0162922 | A1* | 6/2015 | Song | ............... | H04L 7/0091 375/376 |
| 2015/0180642 | A1* | 6/2015 | Hsieh | ............... | H04L 7/0025 375/233 |
| 2015/0222303 | A1* | 8/2015 | Stojanovic | ............... | H04L 25/028 375/295 |

OTHER PUBLICATIONS

Jiwang Li and Fei Yuan, "A New Hybrid Phase Detector for Reduced Lock Time and Jitter of Phase-Locked Loops", Analog Integrated Circuits and Signal Processing, vol. 56, Issue 3, Aug. 8, 2008, pp. 233-240.

Yasuaki Sumi et al, "Dead-zone-less PLL Frequency Synthesizer by Hybrid Phase Detectors", Proceedings of the 1999 IEEE International Symposium on Circuits and Systems, 1999, ISCAS '99, May 30-Jun. 2, 1999, Orlando, FL, pp. 410-414, vol. 4.

* cited by examiner

EARLY VOTE
E: EDGE SAMPLE ; D: DATA SAMPLE

FIG. 3A

LATE VOTE

FAST LOCKING CLOCK AND DATA RECOVERY USING ONLY TWO SAMPLES PER PERIOD

FIELD OF THE DISCLOSURE

This disclosure generally relates to clock recovery in a high speed serial data link, and in particular to fast locking using only two data samples per data period.

BACKGROUND OF THE DISCLOSURE

Clock and data recovery (CDR) is an important circuit in many high speed serial interface receivers. As the data at the receive end is not timed with the local clock (receiver side clock), the local clock will typically not be aligned with the centre of the data eye and so the data cannot be sampled/received directly using the local clock. A CDR circuit extracts the clock and data timing information from the received data and defines a sampling point which is closer to the centre of the data eye so that a correct data can be sampled/received.

A phase interpolator based CDR uses a PLL (phase locked loop) or DLL (delay locked loop) to implement a reference loop which accepts an input reference clock signal and produces a set of high speed clock reference phase signals spaced evenly across 360 degrees. These reference phases are then fed to a CDR loop which includes circuitry for selecting pairs of reference phases and interpolating between them to provide clocks for recovering the data from the data signal. Each time the system is started, a relatively long time period will be required to lock into the correct pair of reference phase signals.

The Low Latency Interface (LLI) is a point-to-point interconnect promulgated by the MIPI Alliance that allows two devices on separate chips to communicate as if a device attached to the remote chip is resident on the local chip. The connection between devices is at their respective interconnect level, e.g. OCP (on-chip protocol), AMBA® protocols, using memory mapped transactions. A LLI Link is a bidirectional interface allowing either device to initiate transactions. LLI provides a low latency interface for internal or external devices (e.g. DRAM) between two integrated circuits (ICs). The bandwidth is scalable from 2.9 Gb/sec over one differential signal pair, called a lane, to 17 Gb/sec over 6 lanes—in each direction. Differential serial data is driven and received by Type 1 M-PHY's defined by the PHY (Physical layer) working group of the MIPI Alliance and is intended to handle data rates in excess of 1000 Mbits/sec. M-PHY is named after the Roman number "M" for 1000. Each data lane has an M-PHY at both ends. The analog PHY's are managed by an LLI controller on their respective ICs, and those controllers interface to the rest of the IC.

BRIEF DESCRIPTION OF THE DRAWINGS

Particular embodiments in accordance with the disclosure will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Clock and data recovery (CDR) is an important function in many high speed serial interface receivers in which the receiver clock is asynchronous to the received data. Since the data at the receive end is not synchronized with a local clock on the receiver, the local clock will typically not be aligned with the centre of the data eye and therefore the data cannot be sampled directly using the local clock. A CDR circuit extracts the clock and data timing information from the received data and defines a sampling point which is closer to the centre of the data eye so that correct data can be sampled correctly. A technique for fast locking of the recovered clock using only two samples per data period will be disclosed herein.

Figure 1:
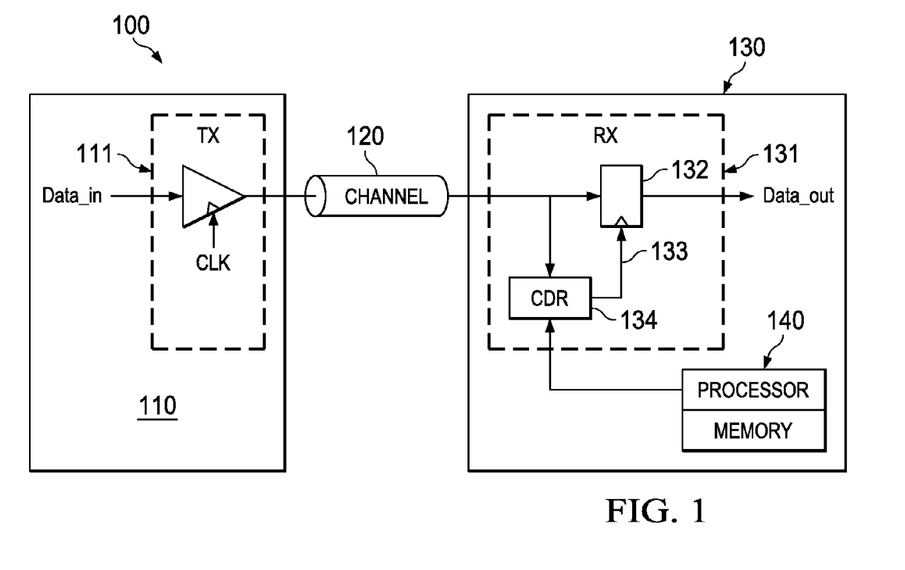
FIG. 1 is a block diagram of a high speed serial link.

FIG. 1 is a block diagram of a system 100 that includes a high speed serial link between a system module 110 and a system module 130. Modules 110, 130 may be any type of module that consumes or produces data. Typically, each module may be located in a different integrated circuit (IC). However, in some systems the modules may be located on different parts of a single system on chip (SoS) IC that may have different clock regions, for example. For example, module 110 may be a camera that produces video or still picture data, a radar system that produces object location data, etc. Module 130 may be part of a mobile phone, a laptop computer, tablet computer, desktop computer, an industrial computer, etc., for example. System 100 may be a consumer product, an industrial control system, a gaming system, an automotive system, a medical device, etc., for example. In another example, module 110 may be a memory circuit, for example, and module 130 may be a processor circuit in a smart phone that is accessing the memory circuit using the serial link.

Transmitter 111 in module 110 receives data produced by module 110, serializes the data using any known or later developed serialization technique, and transmits the serial data stream across channel 120 to receiver 131. For example, 8B10B encoding, or a variant thereof, may be used to create a serial data stream that assures edge transitions in the data stream occur often enough in order to allow clock recovery to be performed on the data stream. Channel 120 may be a conductive wire or cable using single ended or differential signals, an optical wave guide, etc. Receiver 131 includes a clock and data recovery (CDR) module 134 that generates a clock signal 133 that may be used to clock a register 132 to capture data from the serialized data stream.

In some embodiments, a processor 140 in the receiver module 130 may be configured to execute instructions stored in a memory coupled to the processor that allow the processor to select one or more operating parameters that may be used by the CDR during locking and tracking, as will be described in more detail below. Processor 140 may be any type of known or later developed processor that can be programmed using stored instructions, for example. Alternatively, processor 140 may be a state machine or other type of control logic that may be configured to control various signal lines that may be used to adjust the operating parameters of CDR 134.

Figure 2:
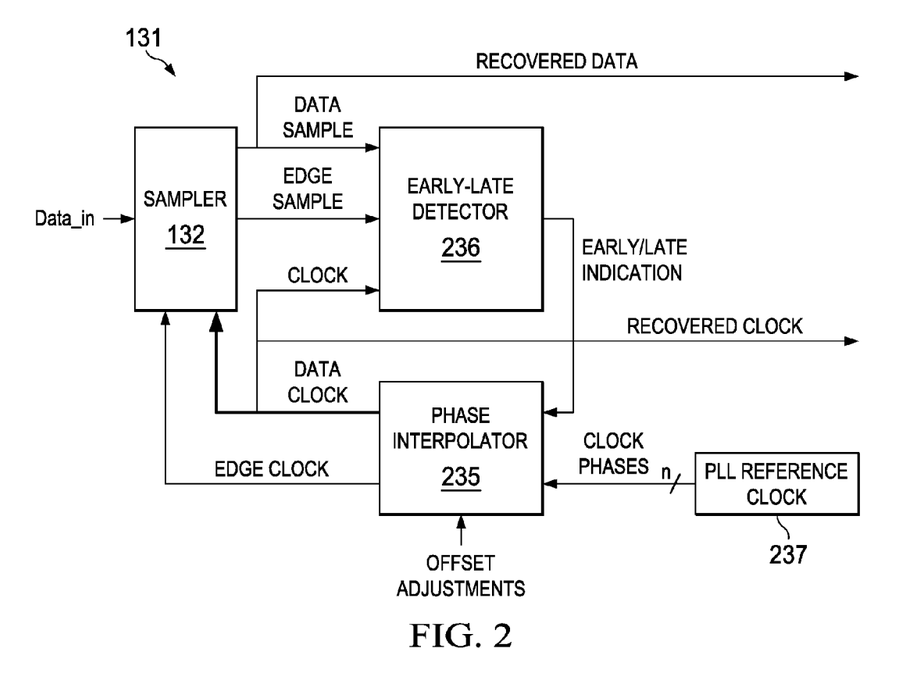
FIG. 2 is a more detailed block diagram of a receiver for use in the serial link of FIG. 1.

FIG. 2 is a more detailed block diagram of a receiver for use in the serial link of FIG. 1. The general operation of a CDR is well known and need not be described in detail herein. A CDR using a bang-bang phase detector has become increasingly popular for its low power operation. The bang-bang CDR disclosed herein requires only two samples per UI (Unit Interval). One sample is called the data sample which is used as an extracted data bit under lock conditions. The other sample is called an edge sample that is aligned to an averaged data transition under lock conditions. The samples may be taken using phase signals that are selected from a set of phase signals provided by a local clock source, such as PLL 237. While a PLL is illustrated here, other embodiments may use a DLL or other type of oscillator circuit to produce a set of phase signals that are approximately evenly spaced across 360 degrees of the data unit interval.

Phase interpolator 235 may then select a pair of phase signals to be designated as the edge clock and the data clock. The goal is to select a pair of phase signals such that the data clock occurs approximately in the center of the UI in order to reliably sample each data bit. When the system is initially started, the relationship of the initially selected pair of phase signals to the incoming data stream may or may not be correct. A processes referred to as "locking" the clock to the incoming data stream involves a training phase and a tracking phase. During the locking phase, different pairs of phase signals are selected to move the edge clock closer to the time at which the data transitions at the edge of each UI. During the tracking phase, the phase selection may be adjusted in small increments to maintain the edge clock in proximity to the data transition region. As long as the edge clock remains locked in proximity to the data transition region, the data clock will be approximately centered in the data eye.

Interpolator 235 may include a state machine or another form of control logic to control the operation of the locking and tracking phases described herein. Alternatively, a separate state machine or other form of control logic may be coupled to interpolator 235 to control the operation of the locking and tracking phases.

Figure 3A:
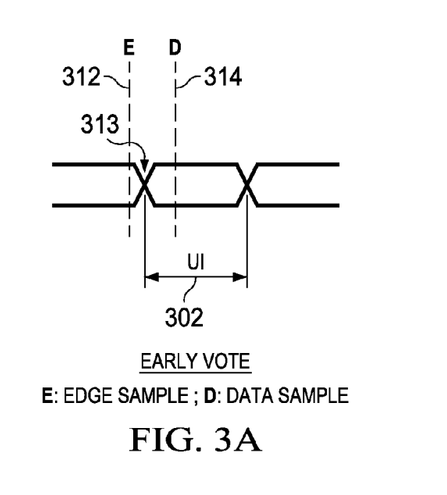
FIGS. 3A and 3B are timing diagrams illustrating detection voting.
Figure 3B:
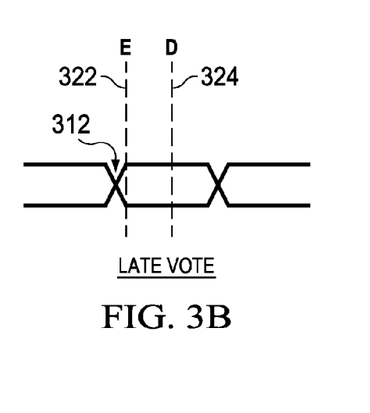

FIGS. 3A and 3B are timing diagrams illustrating detection voting. Assume for this discussion that a training pattern is being received that is an alternating pattern of ones and zeros, in which each value is held for one unit interval, as indicated at 302, for example.

A vote may be taken for each edge sample to indicate if the edge sample is early or late with respect to the actual data transition. For example, in FIG. 3A, edge sample 312 occurs before transition region 313 while data sample 314 occurs after transition 313. In this case, edge sample 312 will have an opposite value from data sample 314. In FIG. 3B, edge sample 322 occurs after transition region 323 while data sample 324 also occurs after transition 323. In this case, edge sample 322 will have a same value as data sample 324.

If there has been a transition between two adjacent data samples, then the edge sample is compared with the second data sample and the edge samples are deemed to lead the data samples. If they are different, then the edge sample was before the transition, or "early" as shown in FIG. 3A. If the edge and data samples are the same, then the edge sample is after the transition or "late", as shown in FIG. 3B.

Referring again to FIG. 2, early-late detection logic 236 performs voting described above. Interpolator 235 receives the set of n phase signals provided by clock circuit 237 and selects two phase signals that are approximately 0.5 UI apart in time. In this example, n=64, such that there are 64 phase signals evenly spaced across 360 degrees of one UI time period. Early votes cause a step "decrement" to the interpolator position, which may also be referred to as the "phase wheel". Each decrement step moves the data and edge sample positions in the "late" direction, or to the right in FIG. 3A. Conversely, late votes will "increment" the phase wheel in the early direction and cause the data and edge samples to move to the left in FIG. 3B. This forms a closed control loop which will cause the edge samples to track or "lock" to transitions in the incoming data. The data samples are taken mid-way between the edge samples in the stable part of the "eye" under lock conditions.

Figure 4:
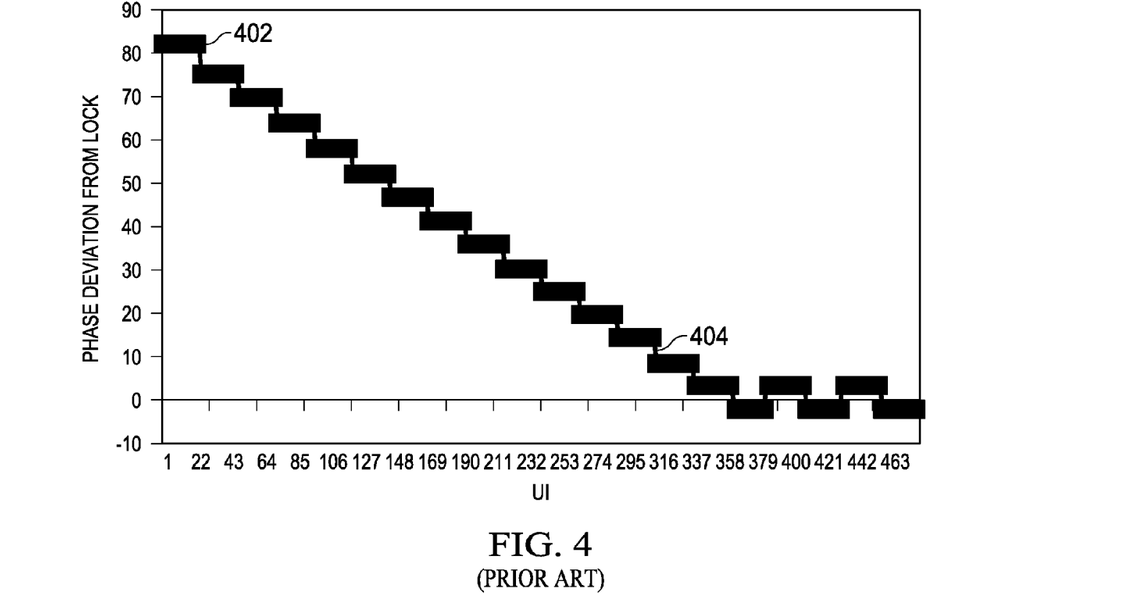
FIG. 4 is plot illustrating locking and tracking using a prior art technique.

FIG. 4 is plot illustrating locking and tracking using a prior art technique. In this prior art example, each phase adjustment is performed using a fixed step size. This is because the early-late detector provides information only about the edge sample being early or late compared to the data transition and there is no information about the exact phase difference. Due to this, the CDR takes long time to lock. For example, the OMAP5430-ES2.0 available from Texas Instruments uses this CDR locking procedure and the achieved lock time may be as much as 320 UI, as indicated at 404. Note the each time a phase adjustment is made, the system must wait a number of UI before making the next adjustment, as indicated at 402, for example.

Such a long lock time may be undesirable in an LLI kind of applications in which a system or a portion of a system may be powered off and on frequently in order to reduce power consumption. For example, if a processor 130 is accessing a memory 110, referring again to FIG. 1, then the memory access time will be delayed by the lock time when the link is first powered on. However, many types of applications may require faster memory access which means a faster CDR lock while still keeping the power use to as low as possible.

Several improved versions of the bang-bang CDR have been reported to achieve faster lock; however, all of them use more than two samples per UI to get the phase difference information. The extra sampling increases power usage which is not desirable for LLI applications, as mentioned above. For example, see "An Improved Bang-bang Phase Detector for Clock and Data Recovery Applications," Mehrdad Ramezani, et al. 2001.

A process for rapidly locking the clock will now be disclosed that may be implemented in a Low Latency Interfaces (LLI) for an MPHY device, for example. In the embodiment disclosed herein, locking may be achieved within 50 UI while still using only two samples per UI, which is not possible with the prior art bang-bang CDR.

Figure 5:
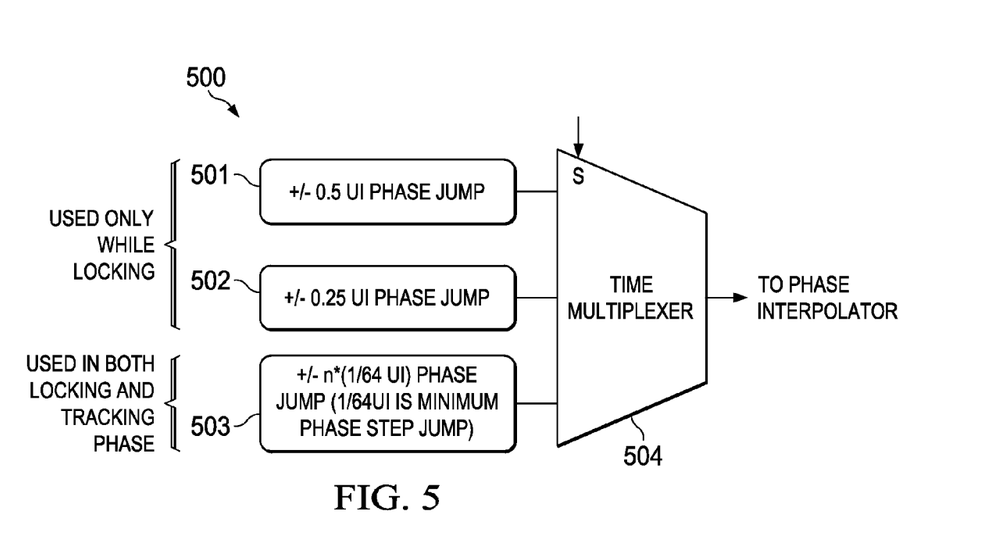
FIG. 5 is block diagram illustrating circuitry for selecting course and fine step sizes.

FIG. 5 is block diagram illustrating circuitry 500 for selecting course and fine step sizes in the bang-bang CDR of FIG. 2. In addition to the fixed phase steps taken for every vote (as used in a conventional CDR), non-linear steps (0.25 UI and 0.5 UI phase steps) may also be taken to achieve faster lock. Circuitry 500 allows a course step size 501 of approximately 0.25 UI to be selected during the locking phase. Circuitry 500 also allows a course step size 502 of 0.5 UI to be selected during the locking phase. A fine step size 503 may be selected during locking and during tracking. In this example, the fine step size may be a variable number m of the minimum step size, which in this example is 1/64 UI. In other embodiments, the minimum step size may be larger or smaller than 1/64 UI. Equation 1 illustrates an example variable step size. Multiplexor 504 may be controlled by a state machine or other control logic to select the various step sizes during locking and tracking.

$$\text{variable step size}=+/-m*\text{minimum UI step} \quad (1)$$

Figure 6A:
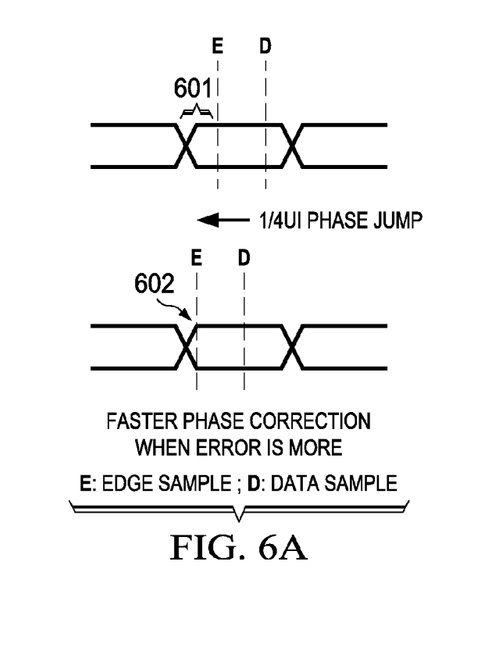
FIGS. 6A and 6B are timing diagrams illustrating clock phase adjustment using a course step size.
Figure 6B:
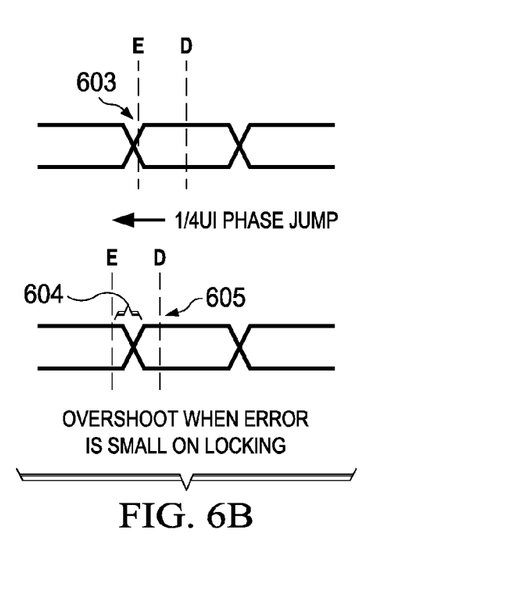

FIGS. 6A and 6B are timing diagrams illustrating clock phase adjustment using a course step size. An initial course step size, such as a ¼ UI phase jump step, may be performed when locking begins to correct the phase error faster and thereby speed up locking of the CDR. FIG. 6A illustrates an initial phase error 601. After a course step adjustment of ¼ UI, phase error 602 is minimal. However, if the correction required during locking is small, then the course step size may result in overshooting to form a phase error in the opposite direction as shown in FIG. 6B. In FIG. 6B, an initial minimal phase error 603 turns into a larger phase error 604 after a course step adjustment of ¼UL As illustrated, a ¼ UI phase jump may result in a maximum of ¼ UI phase error after the first jump in the absence of jitter. However, as long as the allowable locking time is sufficient to correct ¼ UI of phase error after the first phase jump, then any overshoot error introduced by the phase jump will be corrected within the allowable lock time.

During an initial ¼ UI phase jump, phase interpolator 235 increments/decrements the phase of the clock by ¼UL As a result, the clock period shrinks/expands by ¼UL The early-late detector 236 is a synchronous digital module that works on the derived clock signal. To avoid timing closure at a higher frequency of the early-late vote detector 236 caused by a large change in the clock period, the clock to the early-late vote detector may be gated off for one or more clock cycles when phase interpolator 235 shrinks/expands the clock.

Typically, it may be useful to wait for the CDR loop to settle after an early-late vote to allow the CDR loop some time to apply the phase update. If voting on the samples continues immediately without waiting for the vote to take effect, then the CDR might overshoot the lock position, in a similar manner to the initial ¼ UI phase jump. This waiting period where the CDR is idle is called "Blanking Period". However, some embodiments may not include blanking if there is enough time budgeted to correct any phase error introduced within the allowable locking time.

In this example, continuous phase update without waiting for the vote to take affect may done in the initial stage of locking after the ¼ UI phase jump. The number of cycles over which this no-blanking window is active in which the voting happens continuously may be programmable in some embodiments, or may be a fixed number in other embodiments.

In this example, a blanking window where the CDR waits for the vote to take effect to avoid overshooting is enabled after the 'No-blanking window' in a later stage of locking and throughout the tracking period. During the first Blanking window period, the CDR should at least correct any overshoot introduced in the 'No-blanking window' because of ¼ UI phase jump.

The 'No-blanking window' and the first 'blanking window' together need to correct a maximum of ¼ UI of phase error. This is the maximum phase error remaining after ¼ UI phase jump in the absence of high frequency jitter.

½ UI Phase Jump (Swapping Data & Edge Samples)

Figure 7:
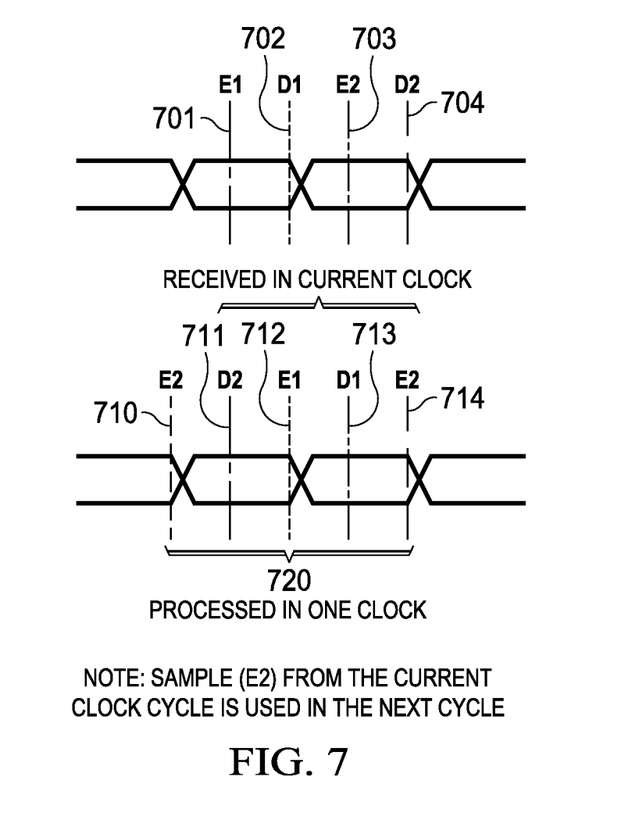
FIG. 7 is a timing diagram illustrating a ½ UI phase adjustment.

FIG. 7 is a timing diagram illustrating a ½ UI phase adjustment. In the presence of high frequency jitter, a maximum phase error to be corrected after the initial ¼ UI phase jump might be ½ UI. As mentioned above, the data and edge samples are separated by ½ UI. A phase error of ½ UI means an expected data sample is sampled as an edge sample and an expected edge sample is sampled as a data sample. For example, edge samples 701, 703 are occurring near the center of the UI, while data samples 702, 704 are occurring near a data transition.

In such cases, instead of correcting the phase error by updating the phase interpolator phase, a correction may be achieved by simply swapping the data and edge samples. In this example, after swapping the data and edge samples, edge samples 711, 713 are occurring near the data transition, while data samples 712, 714 are occurring near a center of the UI.

½ UI phase error detection may be performed in a number of ways. Referring again to FIG. 6B, for example, it may be assumed that after an initial ¼ phase step and one or a few fine phase step adjustments, the edge sample should cross the data transition region such that the edge sample now has an opposite value from the data sample, as illustrated by edge sample 604 and data sample 605. Referring now to FIG. 7, after an initial course phase step adjustment, data sample D1 702 has a same value as edge sample E1 701. This condition implies that the phase error may be close to ½ UI. Therefore, edge sample 701 may be renamed to be data sample 711, data sample 702 may be renamed to be edge sample 712, edge sample 703 may be renamed to be data sample 713, data sample 704 may be renamed to be edge sample 714, etc. As a result, edge sample E1 712 and data sample D1 713 now have opposite values. Additional fine step size adjustments may then be made to quickly lock the clock.

In this example, ½ UI phase error detection is enabled in the 'No-blanking window' and 'blanking window' during locking. Other embodiments may enable ½ UI phase error detection at another time, such as only during an initial blanking window, for example.

In this example, early-late detector 236 process four samples each clock period, such as sample 710-713. If the data sample are both the same value, then that condition may result in a "no vote" condition. This may occur when the data sequence has two or more contiguous data bits that have the same value. Typically, the initial training sequence is an alternating pattern of 0101010, but during the tracking phase the data sequence will include adjacent data bits that have a same value. For example, the 8b10b code allows up to five sequential data bits to have a same value.

After the initial +/−¼ UI course phase step and an optional +/−½ UI course phase step adjustment, a series of programmable fine phase step size adjustments may be made to accurately lock the recovered clock to the transition region of the data sequence. In this embodiment, the fine phase step size may be programmed to any of the following during locking and during tracking. 1 step=1/64 UI phase change; 2 steps=2/64 UI phase change; 3 steps=3/64 UI phase change; and 4 steps=4/64 UI phase change. Other embodiments may allow other combinations of programmable fine phase step adjustments, or may offer only a single fine phase step adjustment, such as 1/64 UI, for example.

Figure 8:
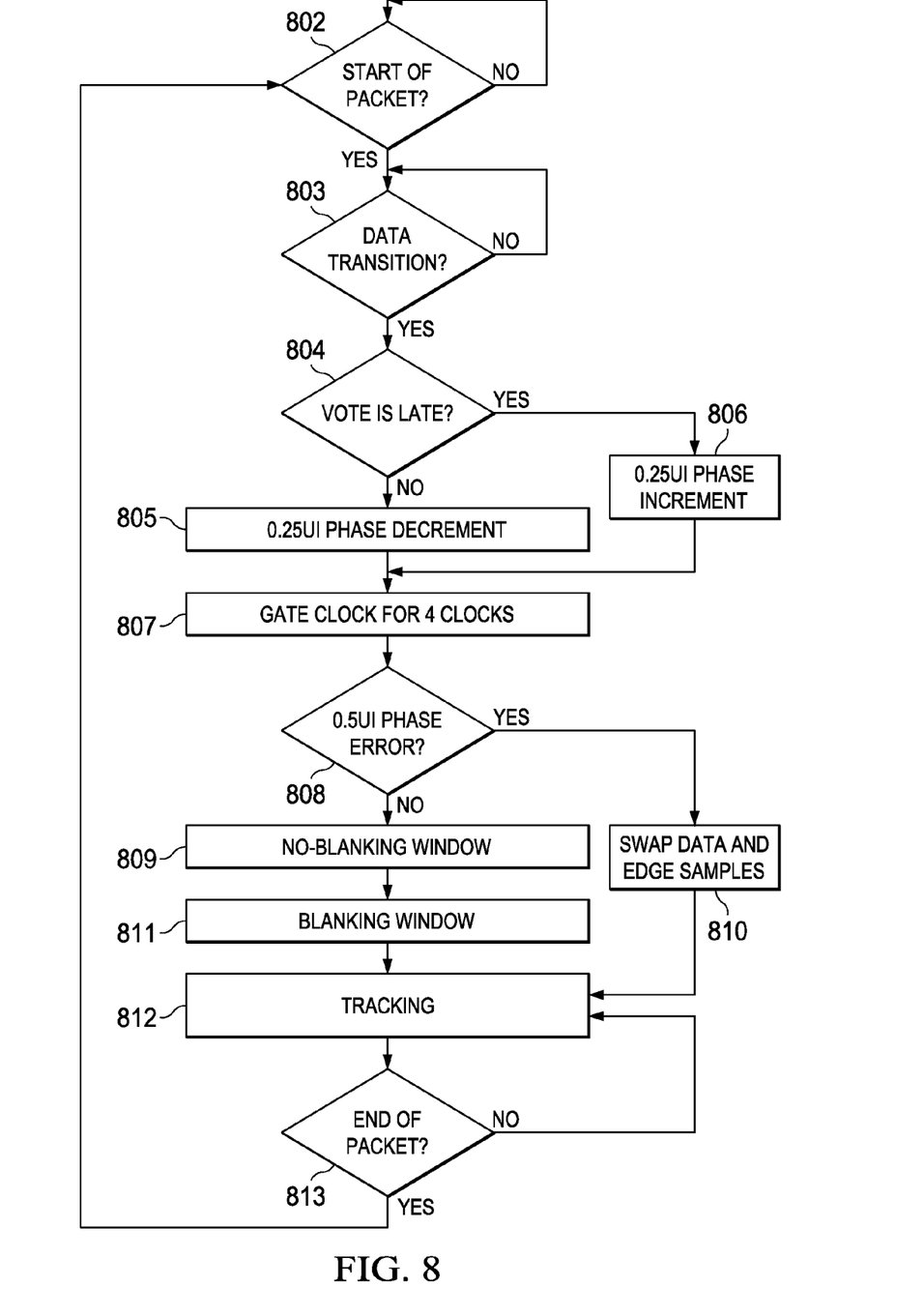
FIG. 8 is a flow diagram illustrating clock recovery locking and tracking.

FIG. 8 is a flow diagram illustrating clock recovery locking and tracking from a sequence of data bits on a communication signal line, as described above. The system remains idle until packet of data starts to be received 802. As described above, the data stream may be assumed to have a defined unit interval for each data bit. A local clock circuit produces a set of clock phase signals that are evenly spaced across 360 of one UI.

Two clock phase signals are initially selected that are separated by 180 degrees for sampling the incoming data stream. One of the selected clock phase signals is designated as the edge clock and the other is designated as the data clock. A locking phase is first performed to realign the edge selected clock phase signals to a transition region between each data bit. After locking is achieved, a tracking phase continues for the duration of the data sequence to make minor adjustments to compensate for jitter.

On receiving 802 a new packet, the samples are analyzed to detect 803 a data transition in the received bit stream When the first data transition is detected, a set of samples are analyzed to produce an early/late vote 804 that indicates whether the edge sample is early or late in reference to a transition region in the data sequence, as illustrated in FIGS. 3A-B.

If the vote indicates an early edge sample, then a course phase adjustment is made by decrementing 805 the phase by ¼ UI. If the vote indicates a late edge, then a course phase adjustment is made by incrementing 806 the phase by ¼ UI. In the case where the vote is null indicating a lack of transitions in the samples, the phase may be decremented by ¼ UI.

At this point, the clock may be gated off 807 for a number of UI cycles to allow for settling. In this example, the clock is gated off for 4 clocks after a ¼ UI phase jump; however, in other embodiments a different gate time may be used.

In this example, a no-blanking window 809 is invoked after the course phase adjustment in which votes are generated continuously. The no-blanking window may be programmed to generate 1/2/3/4 continuous votes in this example. Other embodiments may allow a different range for the non-blanking window.

During the non-blanking window 809, fine phase adjustments may be made in response to each vote. In this embodiment, the fine phase step size may be programmed to 1/2/3/4 steps, where each step is 1/64 UI.

During a blanking window 811, votes are generated with blanking after each vote for a 24 bit period. During the blanking window 811, fine phase adjustments may be made in response to each vote. In this embodiment, the fine phase step size may be programmed to 1/2/3/4 steps, where each step is 1/64 UI.

In this example, the number of cycles to be blanked after each vote may be programmable. For example, if the blanking period is 6-bits, then 3-4 votes will occur during the 24-bit blanking window 811. After that, the flow proceeds to a 'Tracking Phase' 812.

½ UI phase error detection is enabled 808 during the non-blanking window 809 and the blanking window 811. If a ½ UI phase error is detected, as explained with regard to FIG. 7, the data and edge samples are swapped 810. After swapping the data & edge samples in response to ½ UI phase error detection 810, the CDR may start tracking by skipping the rest of locking algorithm. Swapping happens only once per packet.

Tracking phase 812 tracks the aligned edge sample and makes fine phase adjustments to compensate for jitter. During tracking, votes are generated with blanking. The fine phase step size may be programmed to 1/2/3/4 steps in this example. The number of bit periods to be blanked after a vote may also be programmed in this example.

Once the end of the data packet is reached 813, the system returns to an idle state 802 and waits for the next data packet.

Figure 9:
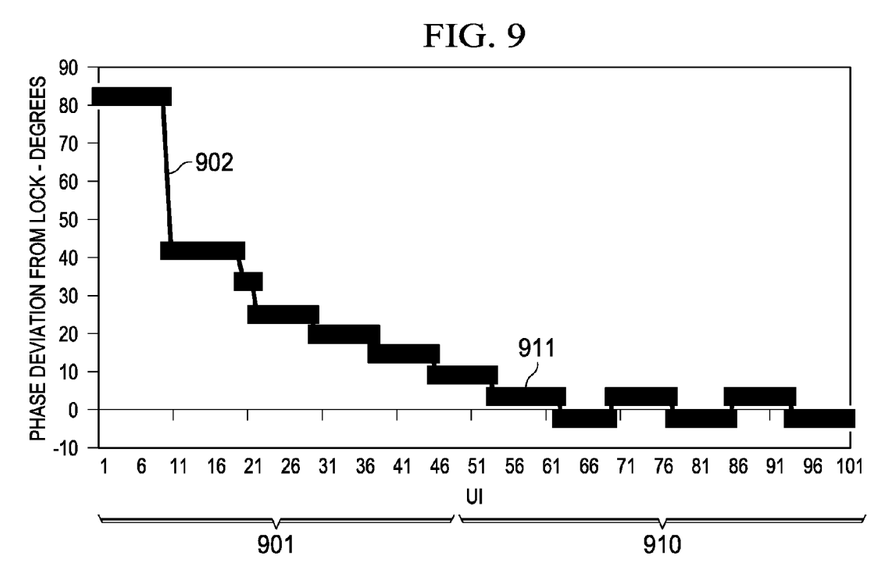
FIG. 9 is plot illustrating locking and tracking using variable step sizes.

FIG. 9 is plot illustrating locking and tracking using variable step sizes as described above. As can be seen from FIG. 9, the CDR achieves a lock within 50 UI during a locking phase 901 because of the initial course non-linear jump 902 of 0.25 UI (45 degrees). Such rapid locking is not possible with the prior art bang-bang CDR as illustrated in FIG. 4. Tracking phase 910 continues until the end of the data packet using fine phase adjustments as indicated at 911.

Figure 10:
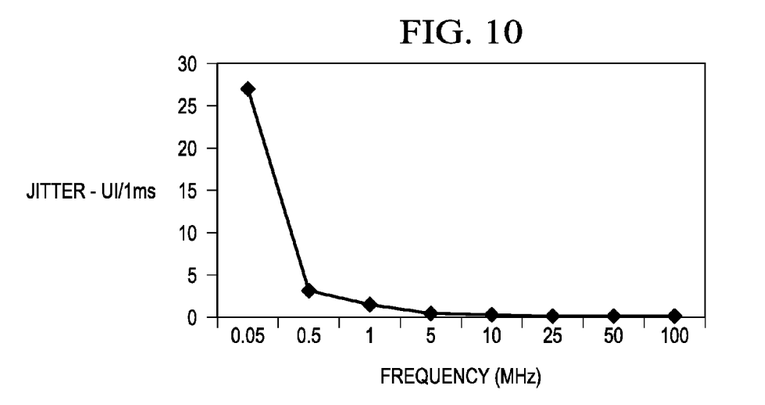
FIG. 10 is a plot illustrating jitter tolerance.

FIG. 10 is a plot illustrating jitter tolerance using the fast locking technique disclosed herein. Jitter is the amount of jitter in UI that may be tolerated during a 1 ms period of time. For lower frequencies of operation, more jitter may be tolerated because a lower frequency UI is longer therefore there is a larger window that will yield correct data sampling. This plot is produced from a simulation of the example CDR disclosed herein and is similar, as expected, to that produced by the prior art device illustrated by the plot in FIG. 4.

OTHER EMBODIMENTS

While the disclosure has been described with reference to illustrative embodiments, this description is not intended to be construed in a limiting sense. Various other embodiments of the disclosure will be apparent to persons skilled in the art upon reference to this description. For example, while a local clock provides 64 phase signals in this example, other embodiments may provide more or fewer phase signals.

While the examples disclosed herein allow programmable selection of the fine step size, the non-blanking window period and the blanking window period, other embodiments may only offer a fixed fine step size and/or a fixed blanking window size, for example.

While a system 100 with a single transmission path is illustrated, other embodiments may include several or dozens of similar transmission paths that may operate individually in parallel to provide increased data bandwidth. Typically, one or more additional transmission paths are provided for transmission in the reverse direction to allow two way communication.

Embodiments of the CDR and methods described herein may be provided on any of several types of digital systems: digital signal processors (DSPs), general purpose programmable processors, microcontrollers, application specific circuits, systems on a chip (SoC) such as combinations of a DSP and a reduced instruction set (RISC) processor, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the disclosure should not be considered limited to the specific ordering of steps shown in the figures and/or described herein.

It is therefore contemplated that the appended claims will cover any such modifications of the embodiments as fall within the true scope and spirit of the disclosure.

What is claimed is:

1. A method for operating a clock and data recovery module, the method comprising:
    receiving a sequence of data bits on a communication signal line, in which the sequence of data bits conforms to a unit interval (UI) of time;
    generating a plurality of clock phase signals;
    selecting two clock phase signals from the plurality of clock phase signals;
    sampling the sequence of data bits at a rate of two times per UI responsive to the two clock phase signals in which a first sample of each UI is designated as an edge sample a second sample is designated as a data sample, in which the edge sample and the data sample are spaced apart by approximately 0.5 UI;
    voting each edge sample as early/late as compared to an associated data transition of the sequence of data bits by comparing each edge sample to a next data sample;
    detecting an approximate 0.5 UI phase error during the locking phase and reversing the edge sample and data sample designations responsive to the 0.5 UI phase error; and
    locking the sample clocks such that edge samples occur in proximity to data transitions by iteratively adjusting a phase of the two selected clock phase signals by a variable step size in response to the early/late vote.

2. The method of claim 1, in which locking the sample clocks includes:
    adjusting the phase of the two selected clock phase signals using a course phase adjustment step responsive to the vote; and then
    adjusting the phase of the two selected clock phase signals using a fine phase adjustment step in an iterative manner responsive to the vote to cause the edge sample clock signal to lock to a transition region of the sequence of data bits.

3. The method of claim 2, in which the course phase adjustment step is in a range of approximately 0.20-0.30 UI.

4. The method of claim 2, in which the fine phase adjustment step is in a range of approximately 0.01-0.07 UI.

5. The method of claim 2, in which adjusting the phase of the selected clock phase signals using a fine phase adjustment includes adjusting the phase of the selected clock phase signals for a selected number of contiguous UI during a first window period of the lock phase.

6. The method of claim 5, in which adjustments to the phase of the selected clock signals are suspended for a selected number of UI during a blanking window after the first window.

7. The method of claim 2, in which the step size of the fine phase adjustment step is selected by a processing module coupled to the clock and data recovery module.

8. A system comprising:
    a data receiver that includes a clock and data recovery (CDR) module, in which the CDR includes:
        a clock module configured to provide a plurality of clock phase signals;
        a phase interpolator coupled to receive the plurality of clock phase signals and operable to select two clock phase signals from the plurality of clock phase signals;
        a sampler having an input port for receiving a sequence of data bits from a communication signal line, in which the sequence of data bits conforms to a unit interval (UI) of time, the sampler being operable to sample the sequence of data bits at a rate of two times per UI responsive to the two clock phase signals in which a first sample of each UI is designated as an edge sample a second sample is designated as a data sample, in which the edge sample and the data sample are spaced apart by approximately 0.5 UI;
        detection logic coupled to receive the edge sample and the data sample, the detection logic being operable to vote each edge sample as early/late as compared to an associated data transition of the sequence of data bits by comparing each edge sample to a next data sample;
        in which the detection logic is operable to detect an approximate 0.5 UI phase error during the locking phase and operable to reverse the edge sample and data sample designations responsive to the 0.5 UI phase error; and
        in which the phase interpolator is configured to lock the sample clocks such that edge samples occur in proximity to data transitions by iteratively adjusting a phase of the two selected clock phase signals by a variable step size in response to the early/late vote.

9. The system of claim 8, in which the interpolator is operable to:
    adjust the phase of the two selected clock phase signals using a course phase adjustment step responsive to the vote; and then
    adjust the phase of the two selected clock phase signals using a fine phase adjustment step in a repetitive manner responsive to the vote to cause the edge sample clock signal to lock to a transition region of the sequence of data bits.

10. The system of claim 9, in which the course phase adjustment step is in a range of approximately 0.20-0.30 UI.

11. The system of claim 9, in which the fine phase adjustment step is in a range of approximately 0.01-0.07 UI.

12. The system of claim 9, in which the phase interpolator is operable to adjust the phase of the selected clock phase signals using a fine phase adjustment for a selected number of contiguous UI during a first window period of the lock phase.

13. The system of claim 12, in which the phase interpolator is operable to suspend adjustment to the phase of the selected clock signals for a selected number of UI during a blanking window after the first window.

14. The system of claim 9, further including a processing module coupled to the clock and data recovery module in which the processing module is operable to select the step size of the fine phase adjustment step.

15. The system of claim 8, further including:
    a data transmitter having an output port; and
    a signal path coupled between the output port of the data transmitter and the input port of the sampler.

* * * * *